(12) United States Patent
Tawarada

(10) Patent No.: US 7,874,949 B2
(45) Date of Patent: Jan. 25, 2011

(54) POWER UNIT WITH AUXILIARY MACHINE DRIVING TRANSMISSION MECHANISM

(75) Inventor: Yuichi Tawarada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 756 days.

(21) Appl. No.: 11/527,604

(22) Filed: Sep. 27, 2006

(65) Prior Publication Data

US 2007/0082774 A1 Apr. 12, 2007

(30) Foreign Application Priority Data

Sep. 30, 2005 (JP) ............................. 2005-285800

(51) Int. Cl.
*F16H 7/08* (2006.01)
*F16H 7/18* (2006.01)

(52) U.S. Cl. ........................ 474/111; 474/101; 474/135; 474/138; 474/140; 123/55.4; 123/90.31; 123/196 R; 123/198 R

(58) Field of Classification Search ................. 474/111, 474/101, 140, 144–147; 74/337.5; 464/68.41; 477/80, 39, 110; *F16H 7/08, 7/18*
See application file for complete search history.

(56) References Cited

U.S. PATENT DOCUMENTS

| | | | | |
|---|---|---|---|---|
| 5,055,088 A | * | 10/1991 | Cradduck et al. | ........... 474/111 |
| 5,743,230 A | * | 4/1998 | Yamazaki et al. | ........ 123/195 H |
| 6,189,499 B1 | * | 2/2001 | Iwata et al. | ............... 123/192.2 |
| 6,279,554 B1 | * | 8/2001 | Sayama et al. | ............... 123/572 |
| 6,820,583 B2 | * | 11/2004 | Maier | ..................... 123/196 R |
| 7,055,487 B2 | * | 6/2006 | Kawakubo et al. | ...... 123/196 A |
| 7,241,240 B2 | * | 7/2007 | Cholewczynski | ........... 474/111 |
| 7,329,196 B2 | * | 2/2008 | Konno et al. | ................ 474/111 |
| 2003/0200940 A1 | * | 10/2003 | Kawamoto | .................. 123/54.4 |
| 2005/0081664 A1 | * | 4/2005 | Kawakubo et al. | ......... 74/337.5 |

FOREIGN PATENT DOCUMENTS

JP 2002-235548 A 8/2002

* cited by examiner

*Primary Examiner*—Robert A Siconolfi
*Assistant Examiner*—San Aung
(74) *Attorney, Agent, or Firm*—Birch, Stewart, Kolasch & Birch, LLP

(57) ABSTRACT

In a power unit, a counter shaft of a transmission and a crank shaft of an internal combustion engine, both located below a main shaft of the transmission, are arranged parallel to each other on a separating plane H of a crankcase. In a transmission mechanism T which drives an oil pump located below the separating plane H, a drive sprocket is placed on the main shaft of the transmission and a driven sprocket is placed on a drive shaft of the oil pump. An endless chain slidably touches a slender long chain guide along the running direction of the endless chain. The chain guide is fitted only to an end wall of an upper crankcase at its fitting part. The chain guide stretches across the end wall of the upper crankcase and an end wall of a lower crankcase, and effectively suppresses vibration of the endless chain.

20 Claims, 6 Drawing Sheets

POWER UNIT WITH AUXILIARY MACHINE DRIVING TRANSMISSION MECHANISM

CROSS-REFERENCE TO RELATED APPLICATION

The present application claims priority under 35 U.S.C. §119 to Japanese Patent Application No. 2005-285800, filed Sep. 30, 2005, the entire contents of which are hereby incorporated by reference.

BACKGROUND OF THE INVENTION

1. Field of the Invention

The present invention relates to a power unit having an internal combustion engine and a transmission and more particularly to an auxiliary machine driving transmission mechanism having an endless transmission belt wound around a drive sprocket and a driven sprocket to drive an auxiliary machine for the internal combustion engine.

2. Description of Background Art

As an example of an auxiliary machine driving transmission mechanism which drives an auxiliary machine for an internal combustion engine, one that has been disclosed in JP-A No. 2002-235548 (FIG. 6) has been known. The disclosed transmission mechanism includes a drive sprocket on the main shaft of a transmission and a chain wound around the drive sprocket in order to drive an oil pump as an auxiliary machine by rotation of the internal combustion engine. The crank shaft of the internal combustion engine, the main shaft as an input shaft for the transmission, and the counter shaft as an output shaft for the transmission are aligned along the vehicle's longitudinal direction and are parallel to each other on a separating plane which divides the crankcase into an upper case and a lower case, with the oil pump located below the separating plane.

In the above related art, since the main shaft on which the drive sprocket is placed lies on the crankcase separating plane, its distance from the oil pump located below the separating plane is short, eliminating the need for a guide for the chain. However, in the case that in order to reduce the longitudinal length of the power unit, composed of an internal combustion engine and a transmission, for the sake of compactness by compact longitudinal arrangement of the internal combustion engine and transmission, the center distance between the crank shaft and the counter shaft is shortened by placing the main shaft above and away from the separating plane, the distance between the drive sprocket on the main shaft and the oil pump located below the separating plane increases, which might cause vibration of the chain.

SUMMARY AND OBJECTS OF THE INVENTION

The present invention has been made in view of the above circumstances and the present invention has as an object to obtain a compact power unit and effectively suppress vibration of the endless transmission belt. Additional objects of the present invention include preventing the endless transmission belt on the drive sprocket from skipping gear teeth and enhancing the effect of damping vibration of the endless transmission belt and reduce the weight of the guide.

According to a first aspect of the present invention, a power unit is provided with an internal combustion engine including a crankcase equipped with a combination of an upper crankcase and a lower crankcase separated vertically by a separating plane, a crank shaft rotatably supported by the crankcase and placed on the separating plane, and an auxiliary machine located below the separating plane. Also provided are a transmission mechanism for driving an auxiliary machine with an endless transmission belt wound around a drive sprocket and a driven sprocket to drive the auxiliary machine; and a transmission including an input shaft which receives power from the crank shaft, and an output shaft which lies below the input shaft and outputs power after gear shift. The input shaft and the output shaft are parallel to the crank shaft. In this power unit, the drive sprocket is placed on the input shaft located above and away from the separating plane, the driven sprocket is placed on a drive shaft of the auxiliary machine, the transmission mechanism slidably touches the endless transmission belt and has a slender long first guide along a running direction of the endless transmission belt, and the first guide is fitted only to the upper crankcase at its fitting part, stretching across the upper crankcase and the lower crankcase.

Accordingly, the input shaft is not on the separating plane. Since the input shaft is above and away from the separating plane, the center distance between the crank shaft and the output shaft can be shortened, which means that the length of the power unit can be shortened in a direction in which the crank shaft and the output shaft are aligned. In addition, since the first guide goes beyond the separating plane, stretching across the upper crankcase and lower crankcase, vibration of the endless transmission belt can be extensively suppressed and also since the guide is fitted only to the upper crankcase, the first guide does not interfere with assembling the crankcase with the upper crankcase and lower crankcase during assembly or maintenance of the power unit.

According to a second aspect of the present invention, one of both ends of the first guide in the direction parallel to the running direction is the fitting part including a bent part formed by being bent in a direction away from the endless transmission belt and the fitting part is fastened to the upper crankcase with a fastener and adjacent to a wind-in part of the endless transmission belt on the drive sprocket.

Accordingly, the fitting part is adjacent to the wind-in part of the drive sprocket and the fastener increases the rigidity. In addition, the fitting part, which includes a bent part, is away from the bearing rotatably supporting the input shaft on which the drive sprocket is placed, because it is bent.

According to a third aspect of the present invention, the power unit further includes a second guide which is located nearer to the driven sprocket than to the drive sprocket and slidably touches the endless transmission belt near the wind-in part of the endless transmission belt on the driven sprocket. The second guide has a fastening part located near the driven sprocket and fastened to the lower crankcase and an engaging part located near the wind-in part on the driven sprocket and engaged with the lower crankcase.

Accordingly, regarding the first guide which is nearer to the drive sprocket than to the driven sprocket, in a part near the drive sprocket, space for the fastening part is easily obtained because the second guide is away from the drive sprocket, and in a part near the driven sprocket. Only space for engagement of the engaging part of the second guide is provided nearer to the driven sprocket. Thus, the second guide can be located near the driven sprocket without increasing the size of the lower crankcase in the vicinity of the driven sprocket.

According to a fourth aspect of the present invention, the first guide has a body part having a guide surface slidably touching the endless transmission belt, and the sectional shape of the body part on a plane orthogonal to the running direction is H-shaped with a connecting wall stretching along a direction perpendicular to the guide surface.

Accordingly, while the weight of the first guide is reduced by hollowing the body part having the guide surface, the rigidity of the body part is decreased and the effect of damping vibration of the endless transmission belt is increased. Also since the sectional shape is H-shaped, the required rigidity is given to the first guide.

According to a fifth aspect of the present invention, the input shaft is coaxially connected with a clutch which transmits and shuts off power from the crank shaft to the input shaft and the fitting part is fitted to a support wall supporting the input shaft rotatably on the upper crankcase. In addition, the guide is located between the support wall and the clutch.

Accordingly, since the first guide is fitted by the use of the support wall supporting the input shaft rotatably, a special member for fitting the first guide is not needed. Furthermore, since the first guide is located between the support wall and clutch, the first guide can be placed in a space which becomes available because the clutch, a relatively large member, is located coaxially with the input shaft.

According to a sixth aspect of the present invention, the first guide includes a body part having a guide surface slidably touching the endless transmission belt, and a hook type engaging part protruding backward from the back of the body part and engaging with the crankcase.

Accordingly, if vibration of the endless transmission belt occurs, the hook type engaging part prevents the body part from moving in a direction perpendicular to the guide surface as pushed by the endless transmission belt, which prevents the effect of suppressing vibration from declining. Also, since the engaging part is of the hook type, using the space formed between it and the body part, the part to be engaged can be easily engaged.

Effect of the Invention

According to the first aspect of the present invention, the following effect is brought about. Since the center distance between the crank shaft and the output shaft can be shortened, the power unit can be made compact in a direction of alignment of the crank shaft and output shaft. Since the first guide can suppress vibration of the endless transmission belt extensively, it can suppress vibration of the endless transmission belt effectively, without deterioration in the working efficiency in the assembly or maintenance of the power unit.

According to the second aspect of the present invention, the following effect is brought about. Since the fitting part, the rigidity of which is increased by the fastener, is adjacent to the wind-in part of the drive sprocket, the first guide effectively prevents the endless transmission belt from skipping gear teeth. Also, though the fitting part is adjacent to the wind-in part of the drive sprocket, it does not affect the strength of the bearing of the input shaft.

According to the third aspect of the present invention, the following effect is brought about. Since the second guide can be adjacent to the driven sprocket without increasing the size of the lower crankcase, the second guide can suppress vibration of the endless transmission belt and prevent it from skipping gear teeth effectively.

According to the fourth aspect of the present invention, the following effect is brought about. In addition to the required rigidity, the first guide can be lightweight and the effect of damping vibration of the endless transmission belt can be improved.

According to the fifth aspect of the present invention, the following effect is brought about. Since a special member for fitting the first guide is not needed, the structure for fitting the first guide is not complicated and the power unit can be lightweight. Furthermore, since the first guide can be placed in a space which becomes available by placement of the clutch, placement of the first guide no longer makes it necessary to increase the size of the power unit.

According to the sixth aspect of the present invention, the following effect is brought about. Since the hook type engaging part prevents the effect of suppressing vibration of the endless transmission belt from declining and can be easily engaged with the part to be engaged when the guide is fitted to the upper crankcase, the working efficiency in fitting the guide is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
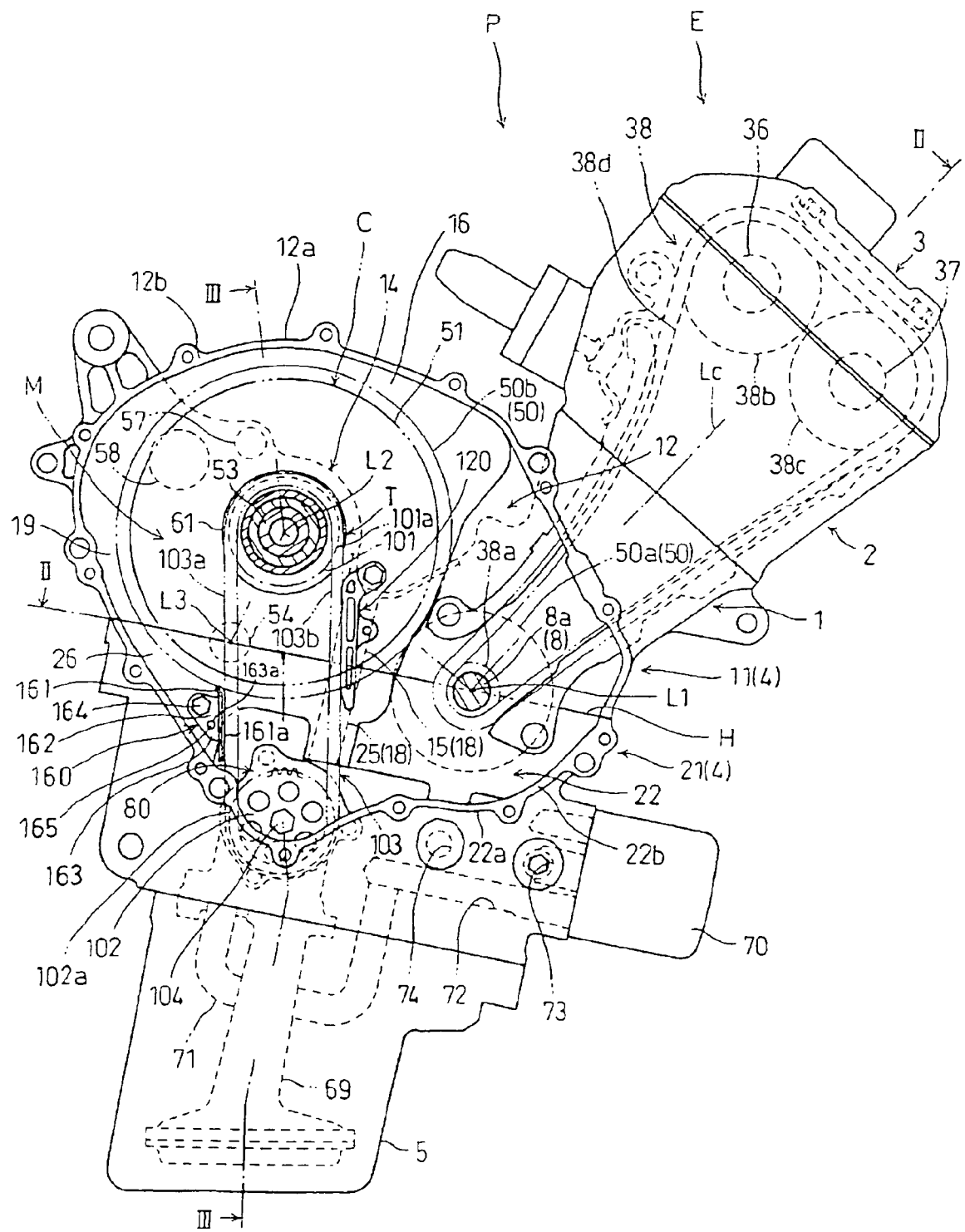
FIG. 1 is a right side sectional view showing part of a power unit, with a case cover removed, which has an internal combustion engine and a transmission having a transmission mechanism to which the present invention is applied, taken virtually along I-I in FIG. 2.
Figure 2:
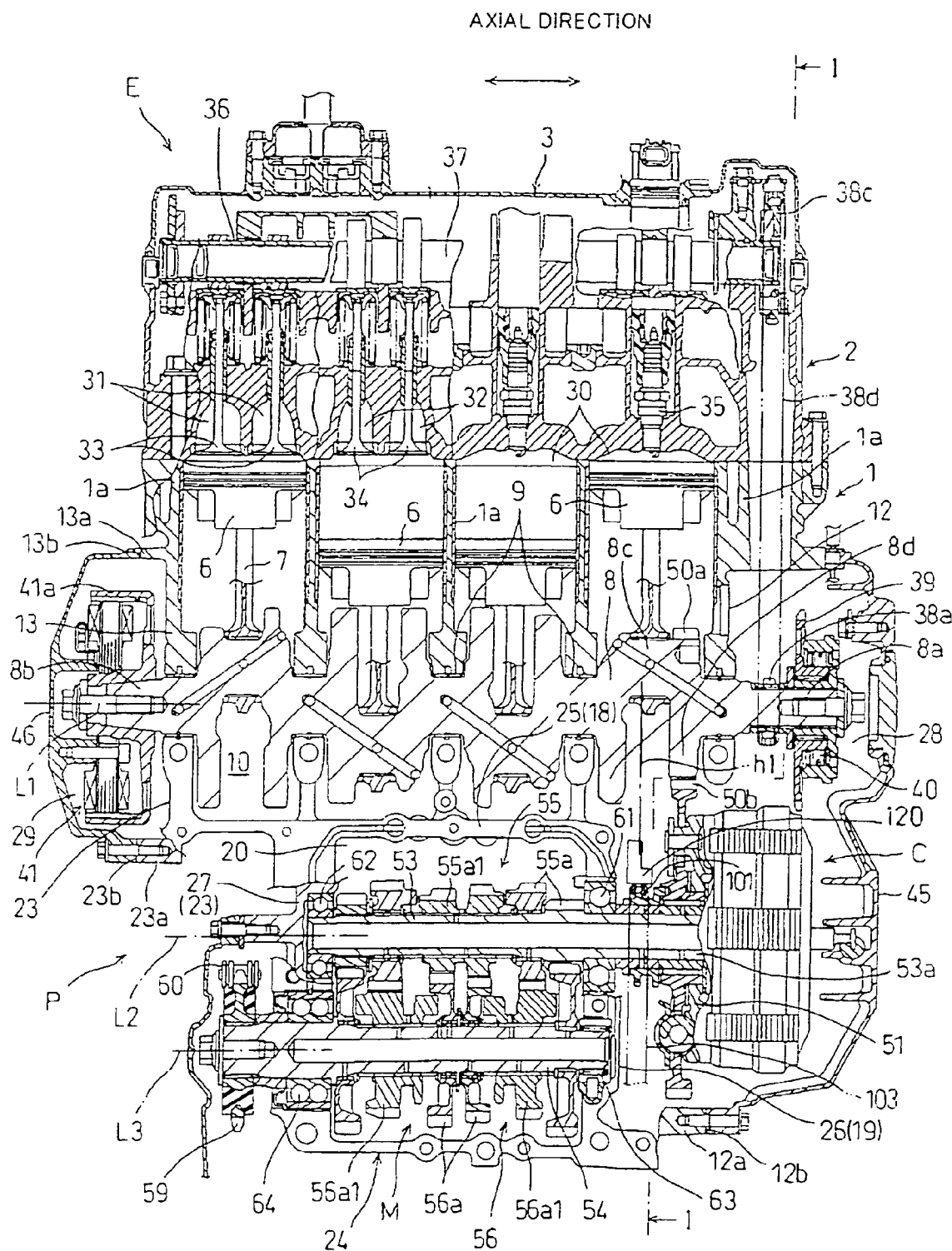
FIG. 2 is a sectional view taken virtually along the line II-II in FIG. 1.

Referring to FIGS. 1 and 2, a power unit P to which the present invention is applied is to be mounted on a motorcycle as a vehicle and includes a water-cooled multicylinder 4-stroke internal combustion engine E, a multiple-disc friction clutch C as a clutch constituting a power transmission mechanism which transmits power generated by the internal combustion engine E to a rear wheel as a driving wheel, and a constant-mesh type gear transmission M as a transmission.

The internal combustion engine E, which is to be mounted on a motorcycle with a rotational centerline L1 of a crank shaft 8 transversely oriented and horizontal, has an engine body which includes: a cylinder block 1 as an integral molding of four cylinders 1a arranged serially, a cylinder head 2 joined to the top end of the cylinder block 1, a head cover 3 joined to the top end of the cylinder head 2, a lower crankcase 21 joined to the bottom end of the cylinder block 1, and an oil pan 5 joined to the bottom end of the lower crankcase 21.

In this embodiment, unless otherwise specified, "front/rear or longitudinal", "upper/lower or vertical", and "left/right or transverse", denote "front/rear or longitudinal", "upper/lower or vertical", and "left/right or transverse" in a condition that the power unit P is mounted on a motorcycle. Also, the axial direction means the direction parallel to the rotational centerline L1.

A piston 6, which is reciprocally fitted into each cylinder 1a, is connected through a connecting rod 7 to a crank shaft 8. The crank shaft 8 is housed in a crank chamber 10 formed by a crankcase 4 as a combination of an upper crankcase 11 and a lower crankcase 21 which are constituted by a lower portion of the cylinder block 1, and is rotatably supported by the crankcase 4 through a main bearing 9 held between the upper crankcase 11 and the lower crankcase 21, and has its rotational centerline L1 on a separating plane H for the upper crankcase 11 and the lower crankcase 21.

Formed in the cylinder head 2 are, for each cylinder 1a, a combustion chamber 30 opposite to a piston 6 in a direction of extension of a cylinder axis line Lc, an intake port 31 which is open to the combustion chamber 30 and opened and closed by a pair of intake valves 33, and an exhaust port 32 which is opened and closed by a pair of exhaust valves 34; furthermore, an ignition plug 35, facing the combustion chamber 30, is attached to the cylinder head 2. Each intake valve 33 and each exhaust valve 34 are opened and closed synchronously with rotation of the crank shaft 8 by a DOHC valve system having an intake cam shaft 36 and an exhaust cam shaft 37 which are rotatably supported by the cylinder head 2. Therefore, the cam shafts 36, 37 are rotated at half the rotation speed of the crank shaft 8 by a valve system transmission mechanism 38 which is composed of a drive sprocket 38a provided at the right shaft end 8a of the crank shaft 8 protruding from the crank chamber 10, cam sprockets 38b, 38c provided at the right shaft ends of the cam shafts 36, 37, and a timing chain 38d wound around the sprockets 38a, 38b, 38c.

A mixture of an air introduced by an intake device and fuel passes through the intake port 31 and enters each combustion chamber 30 when each intake valve 33 is open, where it is ignited by the ignition plug 35 and burns. The piston 6, driven and reciprocated by the pressure of combustion gas in the combustion chamber 30, rotates the crank shaft 8. The combustion gas flows into the exhaust port 32 as an exhaust gas when the exhaust valve 34 is open; then it is forced out by an exhaust device.

Provided on the shaft end 8a are, from the crank chamber 10, the drive sprocket 38a and a one-way clutch 40 which transmits rotation of a starting driven gear 39 driven by a starter motor to the crank shaft 8. Protruding walls 12a, 22a, which axially protrude on right end walls 12, 22 on one side of the upper crankcase 11 and the lower crankcase 21 in the axial direction, constitute a peripheral wall which surrounds the driven gear 39 and the clutch C; and a right case cover 45 is joined, with many bolts, to mating faces 12b, 22b as end faces of the protruding walls 12a, 22a in the axial direction and the case cover 45 and the end walls 12, 22 make up a storage chamber 28 which houses the shaft end 8a, drive sprocket 38a, driven gear 39 and clutch C and opens to the crank chamber 10.

On the other hand, a rotor 41a of an alternating-current dynamo 41 is provided on the left shaft end 8b of the crank shaft 8 protruding from the crank chamber 10. Protruding walls 13a, 23a which axially protrude on left end walls 13, 23 on the other side of the upper crankcase 11 and the lower crankcase 21 in the axial direction constitute a peripheral wall which surrounds the alternating-current dynamo 41; a left case cover 46 is joined, with many bolts, to mating faces 13b, 23b as end faces of the protruding walls 13a, 23a in the axial direction and the case cover 46 and the end walls 13, 23 make up a storage chamber 29 which houses the shaft end 8b and the alternating-current dynamo 41.

Figure 3:
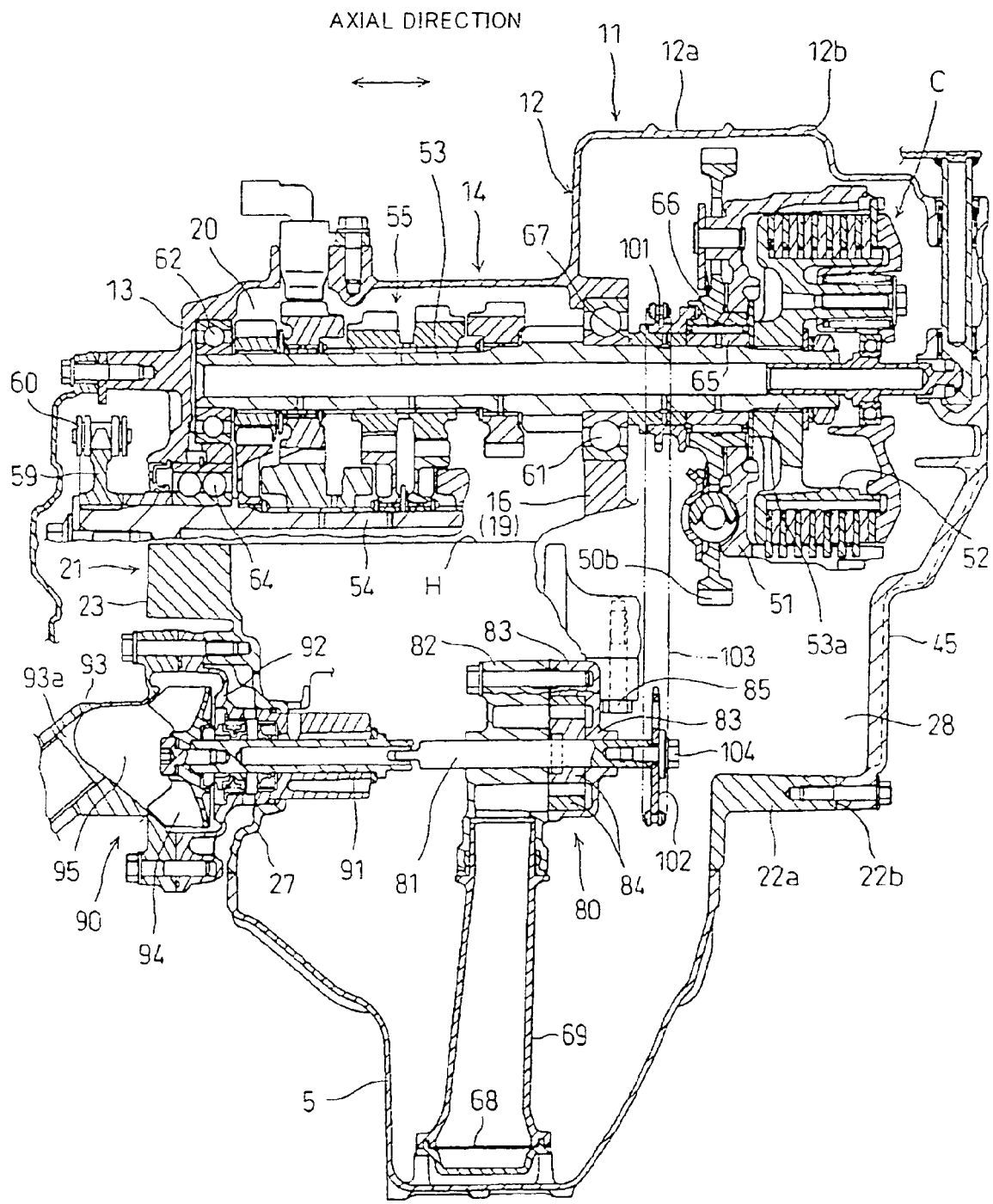
FIG. 3 is a sectional view taken virtually along the line III-III in FIG. 1.

Referring to FIG. 3 as well, power of the crank shaft 8 is transmitted through a primary reduction mechanism 50 to the clutch C and further from the clutch C to the gear transmission M. The primary reduction mechanism 50 includes a drive gear 50a integral with the crank shaft 8, and a driven gear 50b which engages with the drive gear 50a and is provided on a clutch outer 51 as an input member for the clutch C in a way to rotate together with it.

The gear transmission M includes: a main shaft 53 which is splined to a clutch inner 52 as an output member for the clutch C in a way to rotate together and to which a main shift gear train 55 is fitted; a counter shaft 54 to which a counter shift gear train 56 composed of a plurality of shift gears 56a engaging with a plurality of shift gears 55a constituting a shift gear train 55 and an output sprocket 59 as an output member are fitted; and a gear shift operation mechanism having a shift drum 58 which is operated and turned by a shift spindle 57 driven by a shift lever. Here, the main shaft 53 is an input shaft which receives power from the crank shaft 8 and the counter shaft 54 is an output shaft which outputs power after gear shift.

The gear shift operation mechanism has shifters 55a1, 56a1 which rotate together with the main shaft 53 or the counter shaft 54 and are made up of some of the shift gear 55a and the shift gear 56a where the shifters 55a1, 56a1 are moved in the axial direction through a shift fork (not shown) driven by the shift drum 58 which is activated in response to operation of the shift lever and in order to establish the desired gear ratio, connect the shift gear 55a and shift gear 56a engaging with each other so that they respectively rotate together with the main shaft 53 and the counter shaft 54.

The power of the crank shaft 8 after gear shift by the gear transmission M is transmitted to the rear wheel through a secondary reduction mechanism having a transmission chain 60 wound around an output sprocket 59 and the driven sprocket of the rear wheel.

The main shaft 53, the counter shaft 54 and both the shift gear trains 55, 56 are housed in a transmission chamber 20 which includes a transmission case composed of an upper transmission case 14 as a first transmission case including a rear part as part of the upper crankcase 11, and a lower transmission case 24 as a second transmission case including a rear part as part of the lower crankcase 21. Located behind the crank chamber 10, the transmission chamber 20 is isolated from the crank chamber 10 and the storage chamber 28 by a first partition wall 18 and a second partition wall 19 which include part of the upper transmission case 14 and lower transmission case 24, and is open downward to the oil pan 5 like the crank chamber 10 and the storage chamber 28. Here, the first partition wall 18 includes protruding walls 15, 25 inside the crankcase 4 of the upper transmission case 14 and the lower transmission case 24; and the second partition wall 19 includes end walls 16, 26 (which include rear parts as parts of the end walls 12, 22) of the upper transmission case 14 and the lower transmission case 24.

The first partition wall 18, stretching almost parallel to the axial direction, separates the transmission chamber 20 from the crank chamber 10 in a direction orthogonal to the axial direction (hereinafter called "orthogonal direction") and the second partition wall 19, stretching almost parallel to the orthogonal direction, separates the transmission chamber 20 from the crank chamber 10 and the storage chamber 28 in the axial direction.

The main shaft 53 is rotatably supported by the second partition wall 19 and the left end wall 17 (part of the rear left end wall 13 of the upper crankcase 11) of the upper transmission case 14 opposite to the second partition wall 19 in the axial direction through a pair of bearings 61, 62 as bearings supporting the main shaft 53 respectively. The counter shaft 54 is rotatably supported by the second partition wall 19 and the end wall 17 of the upper transmission case 14 opposite to the second partition wall 19 in the axial direction and the end wall 27 of the lower transmission case 24 (part of the rear left end wall 23 of the lower crankcase 21) through a pair of bearings 63, 64 respectively. The bearing 63 is held between the end walls 16, 26 as two subpartition walls of the second partition wall 19, and the bearing 64 is held between both end walls 17, 27.

The main shaft 53 and the counter shaft 54 are parallel to each other and respectively have rotational centerlines L2 and L3 which are parallel to the rotational centerline L1. The rotational centerline L3 of the counter shaft 54 is on the separating plane H and the main shaft 53 is above the rotational centerline L1, the shaft ends 8a, 8b and the counter shaft 54. In addition, the crank shaft 8 and the counter shaft 54 are on the separating plane H, namely located in a position which intersects with the separating plane H, where the main shaft 53 is above and away from the separating plane H and the crank shaft 8 and the counter shaft 54 are below the main shaft 53. In this embodiment, the direction in which the crank shaft 8 and counter shaft 54 are juxtaposed in parallel with each other, namely the direction of alignment, coincides with the longitudinal direction. In addition, in the longitudinal direction, the rotational centerline L2 is between the rotational centerlines L1 and L3.

From the transmission chamber 20 side, the drive sprocket 101, driven gear 50b, and clutch C, which transmits and shuts off power from the crank shaft 8 to the main shaft 53 are located coaxially with the shaft end 53a of the main shaft 53 which protrudes to the right from the transmission chamber 20 and stretches in the storage chamber 28. The driven gear 50b, which is joined to the clutch outer 51 in a way to rotate together, is rotatably supported by the main shaft 53 through a collar 65 supported by the shaft end 53a in a relatively rotatable manner, and a bearing 66 including a needle bearing provided on the periphery of the collar 65.

The drive sprocket 101, constituting a transmission mechanism T which rotates an oil pump 80 and a water pump 90 which will be described later, is located between the bearing 61 and the clutch C in the axial direction or between the end wall 16 (which is also the second partition wall 19 as a constituent of the upper transmission case 14) as a support wall supporting the main shaft 53 through the bearing 61, and the clutch C, and rotatably supported by the shaft end 53a through the collar 67 and further joined to the driven gear 50b by an integrally formed protrusion fitted into a hole of the driven gear 50b in a way to rotate together with the driven gear 50b. Therefore, the drive sprocket 101 is driven by the crankshaft 8 through the primary reduction mechanism 50.

Referring to FIGS. 1 and 3, the lubrication system for the internal combustion engine E and the gear transmission M includes: an oil pan 5; an oil pump 80 which discharges lubricating oil taken from the oil pan 5 through a strainer 68 and a suction tube 69; an oil filter 70 which cleans the discharged lubricating oil from the oil pump 80; a water-cooled oil cooler (not shown) which cools the lubricating oil which has passed through the oil filter 70; and many oil paths which lead the lubricating oil into required points including the lubricating points in the internal combustion engine E and the gear transmission M.

The oil pump 80 as an auxiliary machine for the internal combustion engine E includes: a drive shaft 81 which is rotated by power of the crankshaft 8 and includes a trochoid pump and has a rotational centerline parallel to the rotational centerline L1; a pump body 82 with an intake port and a discharge port; and a pump cover 83 which houses a rotor 84 to be rotated by the drive shaft 81 and is joined to the pump body 82 with bolts. The oil pump 80 is fitted to the crankcase 4 by joining the pump cover 83 to the lower crankcase 21 with a plurality of bolts 85.

The lubricating oil taken through the oil strainer 68 and the suction tube 69 from the oil pan 5 flows out of the oil pump 80, passes through a discharge conduit 71, then flows through an oil path 72 in the lower crankcase 21, into the oil filter 70. The lubricating oil which has passed through the oil filter 70 goes through an oil path 73 into an oil cooler; after passing through the oil cooler, it flows into a main gallery 74. After that, the lubricating oil in the main gallery 74 goes through the oil paths in the lower crankcase 21, cylinder block 1 and cylinder head 2 and is supplied to the lubricating points of the internal combustion engine E and the gear transmission M. The lubricating oil which has lubricated the lubricating points drops or flows down in the crank chamber 10, storage chamber 28 and transmission chamber 20 and returns into the oil pan 5.

The cooling system of the internal combustion engine E has a water pump 90 which is attached to the lower crankcase 21 and pressure-feeds cooling water. The water pump 90 as an auxiliary machine for the internal combustion engine E includes: a drive shaft 91 which is coaxial with the drive shaft 81 of the oil pump 80 and rotates together with it; a pump body 92 which is fitted into, and held by, the lower crankcase 21 and also rotatably supports the drive shaft 91; a pump cover 93 which is joined to the pump body 92; and an impeller 94 which is rotated by the drive shaft 91.

Cooling water, the temperature of which has been lowered by heat release by a radiator, flows through an inlet port 93a of the pump cover 93 into the pump chamber 95 which includes the pump body 92 and the pump cover 93 and houses the impeller 94; then the cooling water pressure-fed by the impeller 94 flows out through an outlet port in the pump cover 93 and goes through a conduit to cooling water paths in the cylinder block 1 and the cylinder head 2.

The oil pump 80 and the water pump 90 are located just below the transmission chamber 20 in the space between the transmission chamber 20 and the oil pan 5 and the drive shafts 81, 91 are located below the crank chamber 10 and the transmission chamber 20. While the main shaft 53 (therefore the rotational centerline L2) is located above the separating plane H including the rotational centerlines L1, L3, the oil pump 80 and the water pump 90 are located below and away from the separating plane H.

Referring to FIGS. 1, 3, and 4, the auxiliary machine driving transmission mechanism T which lies in the internal combustion engine E and rotates the drive shaft 81 of the oil pump 80 and the drive shaft 91 of the water pump 90 includes: a drive sprocket 101 as a drive wheel; a driven sprocket 102 as a driven wheel fitted to the drive shaft 81 in a way to rotate together with it; an endless chain 103 as an endless transmission belt wound around both the sprockets 101, 102; and chain guides 120, 160 as a pair of guides which guide the endless chain 103 in contact with the periphery of the endless chain 103 and suppress vibration of the endless chain 103.

The driven sprocket 102, located in a lower portion of the storage chamber 28, is joined to the right shaft end of the drive shaft 81 with a bolt 104 screwed in the axial direction and the driven sprocket 102 is rotated at the same speed as the drive sprocket 101 by the transmission mechanism T.

A first chain guide 120 is located nearer to the drive sprocket 101 than to the driven sprocket 102 and more than half of it lies on the upper side or the main shaft 53 side, opposite to the oil pump 80 and water pump 90 with respect to the separating plane H; and as viewed axially (hereinafter referred to "as viewed sideways"), more than half of it overlaps the clutch outer 51 of the clutch C and the driven gear 50b (see FIG. 1). In addition, as shown in FIG. 2, the chain guide 120 is located between the partition wall 16 as a constituent of the transmission chamber 20 and the driven gear 50b in the axial direction and in a position to intersect with the crank pin 8c joined to the piston 6 fitted into the rightmost cylinder 1a and also intersect with a plane h1 orthogonal to the rotational centerline L1. This plane h1 is between a pair of crank webs 8d which hold the crank pin 8c between them, in the axial direction. Between the end wall 16 and the driven gear 50b in the axial direction, there is space without any wall separating the crank chamber 10 and the transmission chamber 20.

Referring to FIGS. 1 and 4, the chain guide 120, which is slender and long along the running direction of the endless chain 103 and almost L-shaped as viewed sideways, is a member which integrally has a body part 121 having a guide surface 124a slidably touching the tension part 103b of the endless chain 103 and stretching along the endless chain 103, a fitting part 131 which is continuous with the body part 121 and fixed to the end wall 16 (which is also the second partition wall 19 as a constituent of the upper transmission case 14, part of the upper crankcase 11) to which the chain guide 120 is fitted, and an engaging part 141 which protrudes from the back face 125a of the body part 121 backward and engages with a cylindrical pin 153 as a part to be engaged with the end wall 16, where the body part 121, fitting part 131 and engaging part 141 are integrally molded using an elastic material, for example, synthetic resin. The chain guide 120 is fitted only to the end wall 16 at the fitting part 131, stretching over the end wall 16 and end wall 26.

The body part 121, stretching across the end wall 16 and end wall 26, includes a base end 122 near the fitting part 131 and a front end 123 farther from the fitting part 131 than the base end 122, in the endless chain 103 running direction for the chain guide 120. The body part 121 is joined to the fitting part 131 at the base end 122; and the base end 122 is adjacent to a wind-in part 101a as a starting point for engagement with the endless chain 103 on the drive sprocket 101. The endless chain 103 slidably touches the guide surface 124a near the wind-in part 101a; in the vicinity of the wind-in part 101a, in this embodiment, within three tooth pitches p of the drive sprocket 101 from the wind-in part 101a, the endless chain 103 slidably touches it. Therefore, the fitting part 131 is in the vicinity of the wind-in part 101a. Also, the engaging part 141 is almost midway between the base end 122 and the front end 123 in the running direction or almost in the center of the guide surface 124a in the running direction.

In order to facilitate damping of vibration of the endless chain 103, the body part 121 has a recess 126 open toward opposite directions in the axial direction, between the guide surface 124a and the opposite, back surface 125a in a direction perpendicular to the guide surface 124a (hereinafter referred to "perpendicular direction").

For formation of the recess 126, the body part 121 has a guide wall 124 with a guide surface 124a and a back wall 125 with a back surface 125a, between which the recess 126 lies in the perpendicular direction, and a first connecting wall 127 which stretches parallel to the running direction and perpendicular direction and connects the guide wall 124 and back wall 125. Since the connecting wall 127 lies in the center of width W3 of the body part 121 in the axial direction, the sectional shape of the body part 121 on a plane h2 orthogonal to the running direction is H-shaped. The recess 126 lies, in the running direction, across an area which includes a connecting part 125b with the engaging part 141 on the back wall 125 and is wider than width W1 of the connecting part 125b; in this embodiment, it lies across an area W2, larger than half of the guide surface 124a in the running direction, more specifically an area W2 including almost all the guide surface 124a.

The body part 121 has a plurality of, in this embodiment, two connecting walls 128, 129 which connect the guide wall 124 and back wall 125 and are also connected to the connecting wall 127 in a way to partition the recess 126 in the running direction, stretching parallel to the orthogonal plane h2; these connecting walls 128, 129 divide the recess 126 into a plurality of, in this case, three small recesses 126a, 126b, 126c. The connecting wall 128 connects a connecting part 125b of the back wall 125 and the guide wall 124; and the connecting wall 129 connects a connecting part 125c of the back wall 125 for connection with the fitting part 131 at the base end 122, and the guide surface 124. The width of each of the connecting walls 128, 129 in the axial direction is equal to width W3 in this embodiment.

The connecting wall 127 and both the connecting walls 128, 129 give the body part 121 the rigidity required for the chain guide 120 to suppress vibration of the endless chain 103.

The fitting part 131 is one of the ends of the chain guide 120 in the direction parallel to the running direction; it includes a bent part formed by being bent in a direction away from the endless chain 103 and is nearer to the wind-in part 101a than to the engaging part 141 and joined to a cylindrical seat 152 of the end wall 16 with a bolt 151 as a fastener in an immovable manner. The other end in the both ends of the chain guide 120 is the front end 123.

The engaging part 141, which has width W4 smaller than width W3 in the axial direction, is a part which protrudes from the back surface 125a opposite to the guide surface 124a on the connecting part 125b in the perpendicular direction, namely backward; and the engaging part 141 has a hole 141a and the engaging part 141 is engaged with the end wall 16 by inserting a pin 153 integral with the end wall 16 into the hole 141a. The chain guide 120 is fixed to the end wall 16 in a way that the guide surface 124a fits the peripheral profile of the endless chain 103 without the chain guide 120.

Referring to FIG. 1, a second chain guide 160 which is located nearer to the driven sprocket 102 than to the drive sprocket 101, integrally has a plate-like body part 161 having a guide surface 161a slidably touching a slack part 103a of the endless chain 103, a fastening part 162 and an engaging part 163 for fixing the body part 161 to the end wall 26 (which is also the second partition wall 19 as a constituent of the lower transmission case 24, part of the lower crankcase 21).

Figure 4A:
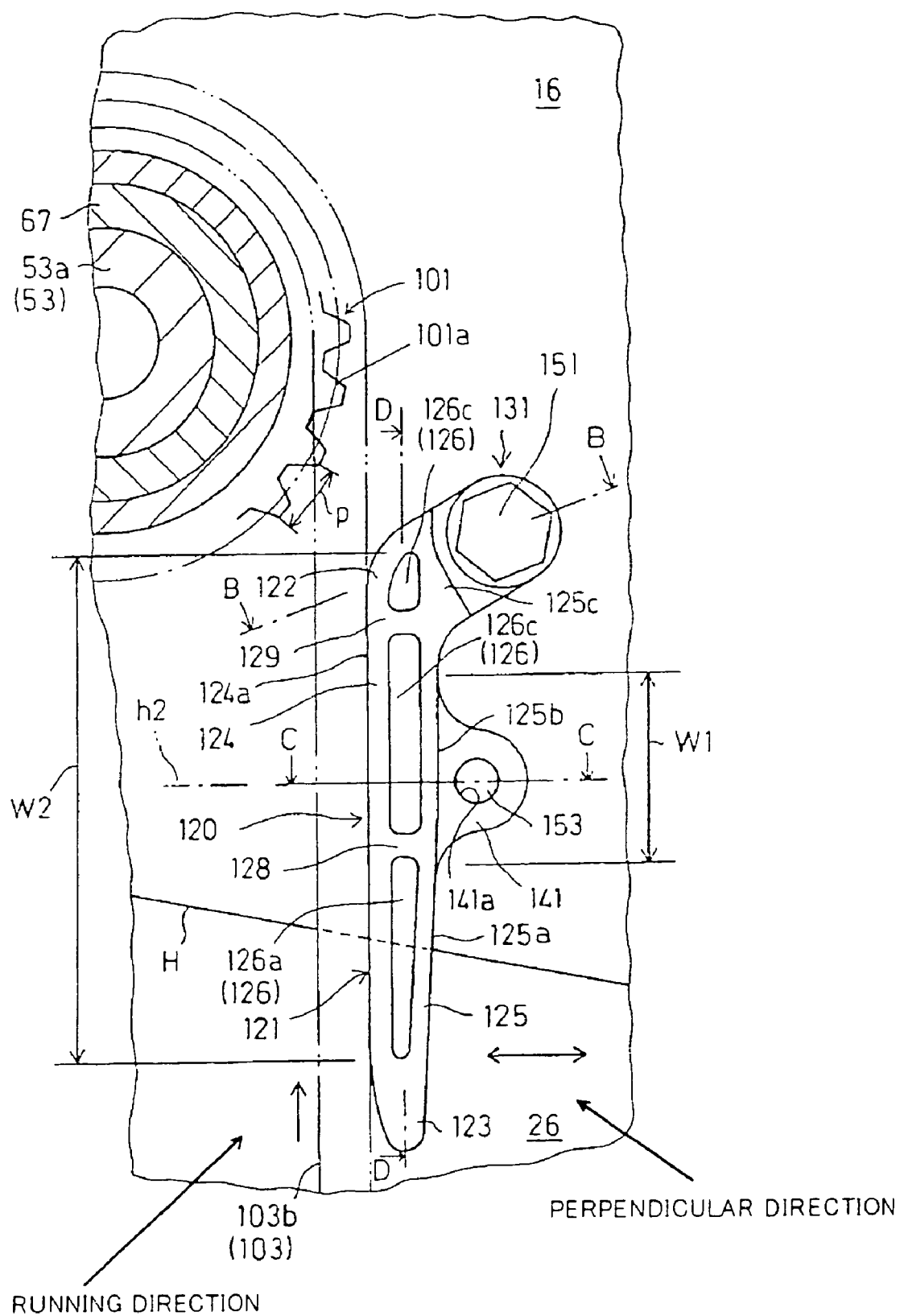
FIG. 4A is an enlarged view of the vicinity of the chain guide in FIG. 1.
Figure 4B:
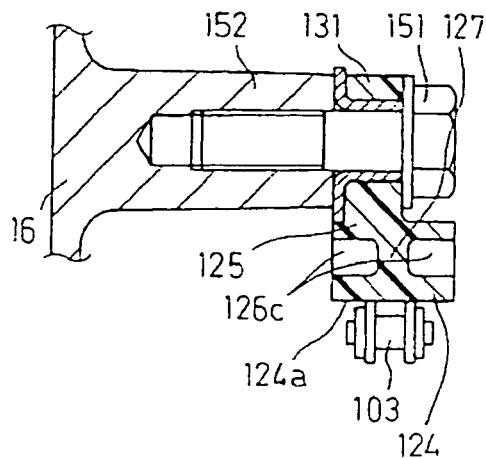
FIG. 4B is a sectional view taken along the line B-B in FIG. 4A.
Figure 4C:
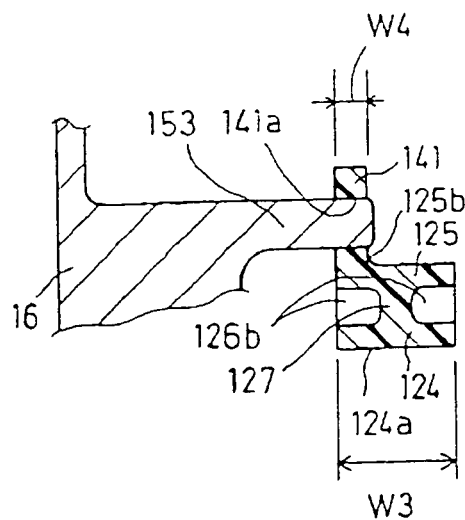
FIG. 4C is a sectional view taken along the line C-C in FIG. 4A.
Figure 4D:
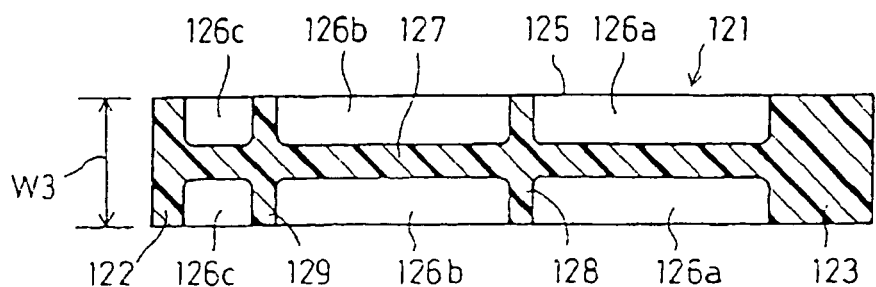
FIG. 4D is a sectional view taken along the line D-D in FIG. 4A.

The endless chain 103 slidably touches the guide surface 161a near a wind-in part 102a, a starting point of engagement of the driven sprocket 102 with the endless chain 103; in the vicinity of the wind-in part 102a, in this embodiment, within three tooth pitches p of the driven sprocket 102 from the wind-in part 102a (each pitch is equal to pitch p of the drive sprocket 101 shown in FIG. 4(A)), the endless chain 103 slidably touches it.

The fastening part 162 is near the driven sprocket 102 on the chain guide 160 and fastened to the end wall 26 in an immovable manner with a bolt 164 as a fastener to be screwed into the end wall 26. The engaging part 163 is near the wind-in part 102a on the chain guide 160. The engaging part 163 has a hole 163a and the engaging part 163 is engaged with the end wall 26 by inserting a pin 165 integral with the end wall 26, as a part to be engaged, into the hole 163a. The chain guide 160 is fixed to the end wall 26 in a way that the guide surface 161a fits the peripheral profile of the endless chain 103 without the chain guide 160.

Next, the function and effect of the abovementioned embodiment will be described.

In the power unit P, the transmission mechanism T which drives the oil pump 80 located below the separating plane H, with the counter shaft 54 and the crank shaft 8, both located below the main shaft 53 and parallel to each other on the separating plane H, includes the endless chain 103 wound around both the sprocket 101 on the main shaft 53 located above and away from the separating plane H and the driven sprocket 102 on the drive shaft 81 of the oil pump 80, and the chain guide 120, which slidably touches the endless chain 103 and is slender and long along its running direction; since the chain guide 120 is fitted only to the end wall 16 at its fitting part 131, stretching over the end wall 16 of the upper crankcase 11 and the end wall 26 of the lower crankcase 21 and the main shaft 53 is above and away from the separating plane H, namely the main shaft 53 is not on the separating plane H, the center distance between the crank shaft 8 and the counter shaft 54 can be shortened, which means that the length of the power unit P can be shortened in the longitudinal direction, a direction in which the crank shaft 8 and the counter shaft 53 are aligned.

In addition, since the chain guide 120 goes beyond the separating plane H, stretching across the end wall 16 and the end wall 26, vibration of the endless chain 103 can be extensively suppressed and also since the chain guide 120 is fitted only to the end wall 16, the chain guide 120 does not interfere with assembling the crankcase 4 with the upper crankcase 11 and lower crankcase 21 during assembly or maintenance of the power unit P. As a consequence, since the center distance between the crank shaft 8 and the counter shaft 54 can be shortened, the power unit P can be made compact in the longitudinal direction. The chain guide 120 can suppress vibration of the endless chain 103 extensively, it can suppress vibration of the endless chain 103 effectively and does not deteriorate the working efficiency in the assembly or maintenance of the power unit P.

One of the ends of the chain guide 120 in the direction parallel to the running direction is the fitting part 131 which includes a bent part formed by being bent in a direction away from the endless chain 103; and the fitting part 131 is fastened to the end wall 16 with the bolt 151 and located near the wind-in part 101a of the drive sprocket 101; therefore, since the fitting part 131 is adjacent to the wind-in part 101a and the bolt 151 increases the rigidity, the chain guide 120 effectively prevents the endless chain 103 from skipping gear teeth. Further, the fitting part 131, which includes a bent part, is away from the bearing 61 rotatably supporting the main shaft 53 on which the drive sprocket 101 is laced because it is bent; therefore, though it is adjacent to the wind-in part 101a, it does not affect the strength of the bearing 61 of the main shaft 53 and the main shaft 53 is supported stably.

The transmission mechanism T has, in addition to the chain guide 120, a second chain guide 160 which is located nearer to the driven sprocket 102 than to the drive sprocket 101 and slidably touches the wind-in part 102a of the driven sprocket 102; the chain guide 160 has a fastening part located near the driven sprocket 102 and fastened to the end wall 26 of the lower crankcase 21, and an engaging part located near the wind-in part 102a and engaged with the end wall 26. Therefore, regarding the chain guide 160, space for the fastening part 162 is easily obtained because the chain guide 160 is away from the drive sprocket 101, and in a part near the driven sprocket 102. Only space for engagement of the engaging part 163 is required near the driven sprocket, so that the chain guide 160 can be located near the driven sprocket 102 without increasing the size of the lower crankcase 21 in the vicinity of the driven sprocket 102. As a consequence, since the chain guide 160 can be located near the driven sprocket 102 without increasing the size of the lower crankcase 21, the chain guide 160 can suppress vibration of the endless chain 103 and prevent it from skipping gear teeth effectively.

The chain guide 120 has the body part 124 having the guide surface 124a slidably touching the endless chain 103 and the sectional shape of the body part 124 on a plane h2 orthogonal to the running direction is H-shaped with the connecting wall 127 stretching along a perpendicular direction, so that while the weight of the chain guide 120 is reduced since the body part 124 having the guide surface 124a is hollowed, the rigidity of the body part 124 is decreased and the effect of damping vibration of the endless chain 103 is increased. Also since the sectional shape is H-shaped, the required rigidity is given to the chain guide 120. As a consequence, in addition to the required rigidity, the chain guide 120 can be lightweight and the effect of damping vibration of the endless chain 103 can be improved.

The main shaft 53 is coaxially connected with the clutch C which transmits and shuts off power from the crank shaft 8 to the main shaft 53 and the fitting part 131 is fitted to the end wall 16, a support wall supporting the main shaft 53 rotatably, the chain guide 120 is located between the end wall 16 and the clutch C and thus the chain guide 120 is fitted using the end wall 16 supporting the main shaft 53 rotatably, so that a special member for fitting the chain guide 120 is not needed and the structure for fitting the chain guide 120 is not complicated and the power unit P can be lightweight. Furthermore, since the chain guide 120 is located between the clutch C and the end wall 16 or between the driven gear 50b, nearer to the end wall 16 than the clutch C, and the end wall 16, the chain guide 120 can be placed in the space which becomes available because the clutch C, a relatively large member, and the driven gear 120 are located coaxially with the main shaft 53, preventing the placement of the chain guide 120 from making it necessary to increase the size of the power unit P.

Also, since the space between the end wall 16 and the driven gear 50b is a space without a wall which separates the crank chamber 10 and the transmission chamber 20, space for the long chain guide 120, which stretches downward from the vicinity of the wind-in part 101a across the end wall 16 and end wall 26, can be obtained without increasing the size of the power unit P.

Since the chain guide 120 is located in a position which intersects with the plane h1 intersecting with the crank pin 8c, the chain guide 120 can be lengthened without interfering with the crank web 8d. In addition, lubricating oil supplied to the crank pin 8c splashes by a centrifugal force, collides against, and adheres to, the chain guide 120 and gathers; the gathered lubricating oil flows down along, or drops from, the chain guide 120 and reaches the endless chain 103, promoting lubrication of the endless chain 103.

If vibration of the endless chain 103 occurs, the engaging part 141 prevents the body part 121 from moving perpendicularly as pushed by the endless chain 103, preventing the vibration damping effect from declining.

Since the connecting wall 129 is provided on the base end 122 having the connecting part 125c for connection of the body part 121 and fitting part 131, the existence of the fitting part 131 increases the rigidity at the base end 122 and vibration of the endless chain 103 just before the wind-in part 101a is suppressed, contributing to prevention of gear teeth skipping.

Since the body part 121 has the recess 126 and the recess 126 makes it easy for the body part 121 to deform elastically, the damping effect of the chain guide 120 is improved.

The body part 121 has the guide wall 124 with the guide surface 124a and the back wall 125 with the back surface 125a, with the recess 126 between them, and in the running direction of the endless chain 103, the recess 126 includes the connecting part 125b for connection of the back wall 125 with the engaging part 141 and lies more widely than the connecting part 125b and the connecting walls 127 to 129 are provided to connect the guide wall 124 and the back wall 125, so that the reactive force from the engaging part 141 which counteracts vibration of the endless chain 103 is transmitted to the body part 121 through the connecting walls 127 to 129 and thus vibration of the endless chain 103 is suppressed.

Next, a partially modified version of the above embodiment will be described, focusing on the modified structure.

Figure 5:
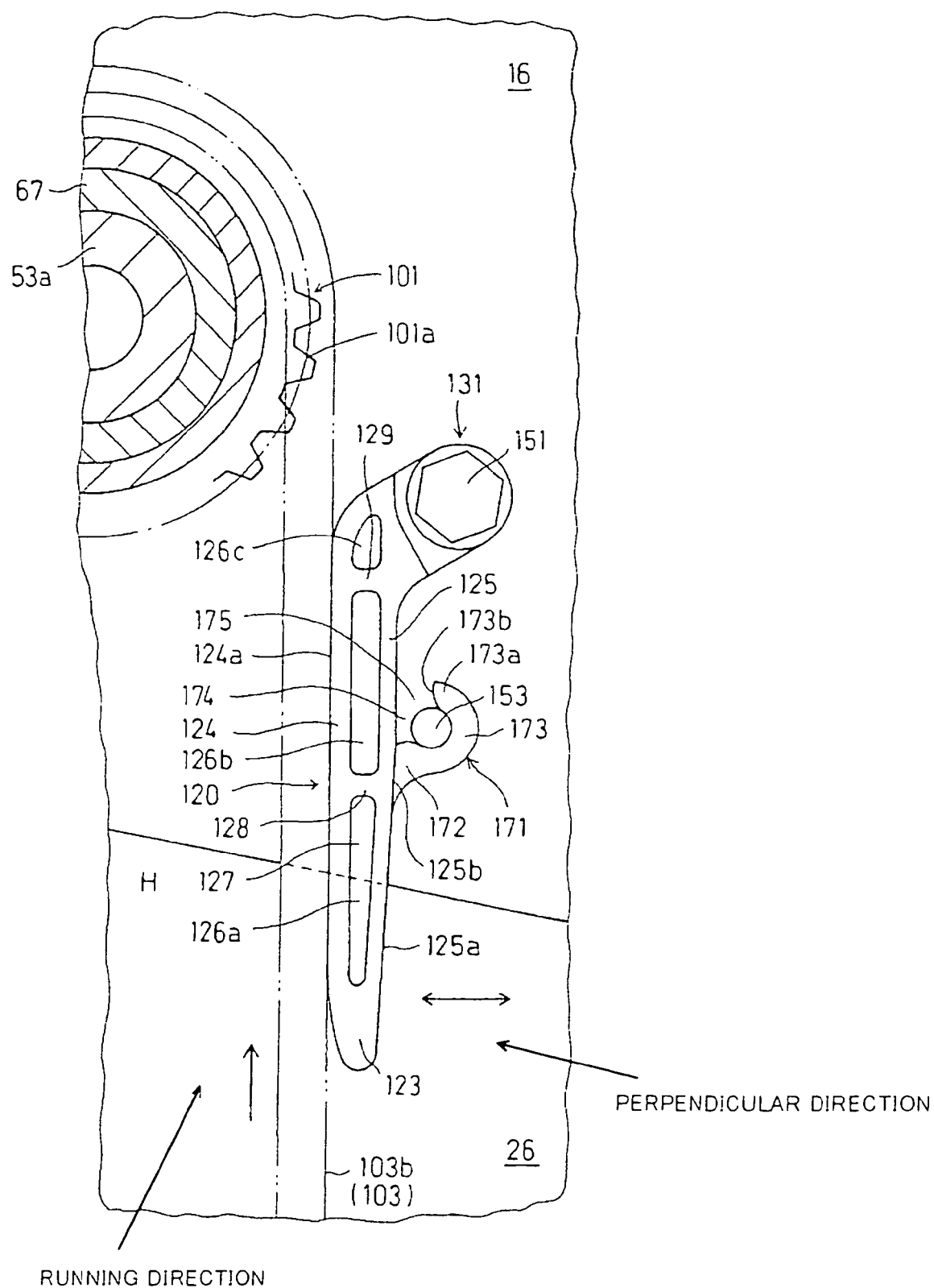
FIG. 5 is a view which shows another embodiment of the present invention and is a counterpart of FIG. 4A.

The chain guide 120's engaging part may be a hook type engaging part 171 as shown in FIG. 5. The structure except the engaging part 171 of the chain guide 120 is the same as in the above embodiment. The engaging part 171 includes; a rising part 172 protruding backward like the engaging part 141; and an arc-shaped hook part 173 with an end part 173a having an end face 173b which stretches continuously with the rising part 172 in a way to surround the periphery of the pin 153 from the front end 123 side and faces the guide surface 124a almost parallel to it. The rising part 172 protrudes opposite to the fitting part 131 with respect to the pin 153 in the running direction. Therefore, in the engaging part 171, an opening 174 which does not surround the pin 153 is formed on the fitting part 131 side of the pin 153 in the running direction and on the side opposite to the back face 125a in the perpendicular direction and the hook part 173 partially surrounds more than half of the periphery of the pin 153. In the perpendicular direction, the space 175 between the end face 173b and the back face 125a is almost equal to the diameter of the pin 153 so that the engaging part 171 can be easily engaged with the pin 153 through the opening 174.

Since the chain guide 120 has the hook type engaging part 171 to engage with the pin 153 of the upper crankcase 11 as mentioned above, the engaging part 171 prevents the body part 121 from moving perpendicularly as pushed by the endless chain 103, preventing the effect of damping vibration of the chain guide 120 from declining. Also, since the engaging part 171 is of the hook type, the pin 153 can be easily engaged using the space 175 formed with the body part 121, thereby resulting to improvement in the working efficiency in fitting the chain guide 120.

The endless transmission belt as a constituent of the transmission mechanism T may be a toothed belt with teeth to engage with the drive sprocket and the driven sprocket.

The transmission may be a gear transmission of a type other than the constant-mesh type or a transmission which is not a gear transmission.

It is also possible that the transmission mechanism T drives only one of the oil pump and the water pump. It is also possible that the auxiliary machine for the internal combustion engine is a device other than an oil pump and a water pump.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit comprising:
    an internal combustion engine including:
        a crankcase including a combination of an upper crankcase and a lower crankcase separated vertically by a separating plane;
        a crank shaft rotatably supported by the crankcase and placed on the separating plane;
    an auxiliary machine located below the separating plane, and
    a transmission mechanism for driving an auxiliary machine with an endless transmission belt wound around a drive sprocket and a driven sprocket to drive the auxiliary machine; and
    a transmission including:
    an input shaft which receives power from the crank shaft; and
    an output shaft which lies below the input shaft and outputs power after gear shift, in which the input shaft and the output shaft are parallel to the crank shaft,
    wherein the drive sprocket is placed on the input shaft located above and away from the separating plane, the driven sprocket is placed on a drive shaft of the auxiliary machine located below and away from the separating plane, the transmission mechanism slidably touches the endless transmission belt and has a slender long first guide along a running direction of the endless transmission belt wound around the drive sprocket and the driven sprocket,
    an engaging part protrudes from the long slender first guide at a position centrally located between opposite ends of the long slender first guide, the engaging part for engaging with a pin which is provided on the upper crankcase in position between the drive sprocket and the separating plane,
    the first guide is fitted only to the upper crankcase by a fitting part formed on the first guide, and stretches across the separating plane between the upper crankcase and the lower crankcase.

2. The power unit according to claim 1, wherein one of both ends of the first guide in a direction parallel to the running direction is the fitting part, the fitting part including a bent part formed by being bent in a direction away from the endless transmission belt, wherein the fitting part is fastened to the upper crankcase with a fastener and is adjacent to a wind-in part of the endless transmission belt on the drive sprocket.

3. The power unit according to claim 1, wherein the power unit further comprises a second guide which is located below the separating plane and nearer to the driven sprocket than to the drive sprocket, the second guide slidably touching the endless transmission belt near the wind-in part of the endless transmission belt on the driven sprocket,
    wherein the second guide has a fastening part located near the driven sprocket and fastened to the lower crankcase, and
    wherein an engaging part of the second guide is located near the wind-in part on the driven sprocket and is engaged with the lower crankcase.

4. The power unit according to claim 2, wherein the power unit further comprises a second guide which is located nearer to the driven sprocket than to the drive sprocket and slidably touches the endless transmission belt near the wind-in part of the endless transmission belt on the driven sprocket,
    wherein the second guide has a fastening part located near the driven sprocket and fastened to the lower crankcase, and wherein an engaging part of the second guide is located near the wind-in part on the driven sprocket and is engaged with the lower crankcase.

5. The power unit according to claim 1, wherein the first guide includes a body part having a guide surface slidably touching the endless transmission belt, a sectional shape of the body part on a plane orthogonal to the running direction being H-shaped with a connecting wall stretching along a direction perpendicular to the guide surface.

6. The power unit according to claim 1, wherein the driven sprocket placed on the drive shaft of the auxiliary machine is located below the drive sprocket.

7. The power unit according to claim 1, wherein the input shaft is coaxially connected with a clutch which transmits and shuts off power from the crank shaft to the input shaft,
wherein the fitting part of the first guide is fitted to a support wall supporting the input shaft rotatably on the upper crankcase, the first guide being located between the support wall and the clutch.

8. The power unit according to claim 2, wherein the input shaft is coaxially connected with a clutch which transmits and shuts off power from the crank shaft to the input shaft,
wherein the fitting part of the first guide is fitted to a support wall supporting the input shaft rotatably on the upper crankcase, the first guide being located between the support wall and the clutch.

9. The power unit according to claim 3, wherein the input shaft is coaxially connected with a clutch which transmits and shuts off power from the crank shaft to the input shaft,
wherein the fitting part of the first guide is fitted to a support wall supporting the input shaft rotatably on the upper crankcase, the first guide being located between the support wall and the clutch.

10. The power unit according to claim 5, wherein the input shaft is coaxially connected with a clutch which transmits and shuts off power from the crank shaft to the input shaft,
wherein the fitting part of the first guide is fitted to a support wall supporting the input shaft rotatably on the upper crankcase, the first guide being located between the support wall and the clutch.

11. The power unit according to claim 1, wherein the first guide comprises:
a body part having a guide surface slidably touching the endless transmission belt; and
an engaging part with a hook which is substantially U-shaped, the engaging part protruding backward from a back of the body part and engaging with the pin,
wherein the pin projects outwardly from an end wall of the crankcase.

12. The power unit according to claim 1, wherein the first guide comprises:
a body part having a guide surface slidably touching the endless transmission belt; and
an engaging part with a hook having an opening on one side, the engaging part protruding backward from a back of the body part and engaging with the pin,
wherein the pin projects outwardly from an end wall of the crankcase.

13. A power unit comprising:
an internal combustion engine including:
a crankcase including a combination of an upper crankcase and a lower crankcase separated vertically by a separating plane;
a crank shaft rotatably supported by the crankcase and placed on the separating plane;
an auxiliary machine located below the separating plane, and
a transmission mechanism for driving a plurality of auxiliary machines with an endless transmission belt wound around a drive sprocket and a driven sprocket to drive the auxiliary machine; and
a transmission including:
an input shaft which receives power from the crank shaft; and
an output shaft which lies below the input shaft and outputs power after gear shift, in which the input shaft and the output shaft are parallel to the crank shaft,
wherein the drive sprocket is placed on the input shaft located above and away from the separating plane, the driven sprocket is placed on a drive shaft of the auxiliary machines located below and away from the separating plane, the transmission mechanism slidably touches the endless transmission belt wound around the drive sprocket and the driven sprocket,
the transmission mechanism including:.
a slender long first guide along a running direction on one side of the endless transmission belt wound around the drive sprocket and the driven sprocket, an engaging part protrudes from the long slender first guide at a position centrally located between opposite ends of the long slender first guide, the engaging part for engaging with a pin which is provided on the upper crankcase in position between the drive sprocket and the separating plane, and the first guide being fitted only to the upper crankcase by a fitting part formed on the first guide, and stretching across the separating plane between the upper crankcase and the lower crankcase; and
a second guide located below the separating plane on an opposite side of the endless transmission belt wound around the drive sprocket and the driven sprocket, the second guide having a shape that is different from that of the first guide.

14. A power unit comprising:
an internal combustion engine including:
a crankcase including a combination of an upper crankcase and a lower crankcase separated vertically by a separating plane;
a crank shaft rotatably supported by the crankcase and placed on the separating plane;
an auxiliary machine located below the separating plane, and
a transmission mechanism for driving an auxiliary machine with an endless transmission belt wound around a drive sprocket and a driven sprocket to drive the auxiliary machine; and
a transmission including:
a main shaft which receives power from the crank shaft; and
an output shaft which lies below the main shaft and outputs power after gear shift, in which the main shaft and the output shaft are parallel to the crank shaft,
wherein the drive sprocket is placed on the main shaft located above and away from the separating plane, the driven sprocket is placed on a drive shaft of the auxiliary machine located below and away from the separating plane, the transmission mechanism slidably touches the endless transmission belt wound around the drive sprocket and the driven sprocket and has a slender long first guide along a running direction of the endless transmission belt, and the first guide is fitted only to the upper crankcase by a fitting part formed on the first guide, an engaging part protrudes from the long slender first guide at a position centrally located between opposite ends of the long slender first guide, the engaging part for engaging with a pin which is provided on the upper crankcase in position between the drive sprocket and the separating plane, and the first guide extends downwardly along a forward side of the endless transmission belt wound around the drive sprocket and the driven sprocket, and stretches across the separating plane between the upper crankcase and the lower crankcase.

15. The power unit according to claim 14, wherein one of both ends of the first guide in a direction parallel to the running direction is the fitting part, the fitting part including a bent part formed by being bent in a direction away from the endless transmission belt, wherein the fitting part is fastened to the upper crankcase with a fastener and is adjacent to a wind-in part of the endless transmission belt on the drive sprocket.

16. The power unit according to claim 14, wherein the power unit further comprises a second guide which is located below the separating plane and nearer to the driven sprocket than to the drive sprocket, the second guide slidably touching the endless transmission belt near the wind-in part of the endless transmission belt on the driven sprocket, wherein the second guide has a fastening part located near the driven sprocket and fastened to the lower crankcase, and wherein an engaging part of the second guide is located near the wind-in part on the driven sprocket and is engaged with the lower crankcase.

17. The power unit according to claim 14, wherein the first guide includes a body part having a guide surface slidably touching the endless transmission belt, a sectional shape of the body part on a plane orthogonal to the running direction being H-shaped with a connecting wall stretching along a direction perpendicular to the guide surface.

18. The power unit according to claim 14, wherein the main shaft is coaxially connected with a clutch which transmits and shuts off power from the crank shaft to the main shaft, wherein the fitting part of the first guide is fitted to a support wall supporting the main shaft rotatably on the upper crankcase, the first guide being located between the support wall and the clutch.

19. The power unit according to claim 14, wherein the first guide comprises:

a body part having a guide surface slidably touching the endless transmission belt; and an engaging part with a hook which is substantially U-shaped, the engaging part protruding backward from a back of the body part and engaging with the pin, wherein the pin projects outwardly from an end wall of the crankcase.

20. The power unit according to claim 13, wherein the first guide comprises:

a body part having a guide surface slidably touching the endless transmission belt, and an engaging part with a hook opening on one side, the engaging part protruding backward from a back of the body part and engaging with the pin, wherein the pin projects outwardly from an end wall of the crankcase.

* * * * *